United States Patent [19]

Knauer

[11] Patent Number: 4,531,209
[45] Date of Patent: Jul. 23, 1985

[54] SELF-ROUTING STEERING NETWORK

[75] Inventor: Scott C. Knauer, Englishtown, N.J.

[73] Assignee: AT&T Bell Laboratories, Murray Hill, N.J.

[21] Appl. No.: 479,797

[22] Filed: Mar. 28, 1983

[51] Int. Cl.³ .................... H04Q 11/00; H04Q 11/04
[52] U.S. Cl. ......................................... 370/56; 370/58
[58] Field of Search .................. 370/56, 58, 60, 94, 370/80; 179/18 FC

[56] References Cited

U.S. PATENT DOCUMENTS

| | | | |
|---|---|---|---|
| 3,428,946 | 2/1969 | Batcher | 370/60 |
| 3,715,505 | 2/1973 | Gordon et al. | 370/60 |
| 3,806,886 | 4/1974 | McClellan et al. | 370/60 |
| 4,009,468 | 2/1977 | Calcagno et al. | 179/18 FC |
| 4,160,128 | 7/1979 | Texier | 370/58 |
| 4,345,273 | 8/1982 | Barabas et al. | 370/58 |
| 4,365,328 | 12/1982 | Merriaux et al. | 370/60 |

OTHER PUBLICATIONS

IEEE Transactions on Computers, vol. C-24, No. 12, Dec. 1975, "Access and Alignment of Data in an Array Processor", D. H. Lawrie, pp. 1145-1155.

IEEE Transactions on Computers, vol. C-20, Feb. 1971, "Parallel Processing with the Perfect Shuffle", H. Stone, pp. 153-161.

IEEE Transactions on Computers, vol. C-23, No. 3, Mar. 1974, "Data Manipulating Functions in Parallel Processors and Their Implementations", Tse-Yun Feng, pp. 309-318.

Primary Examiner—Douglas W. Olms
Assistant Examiner—Wellington Chin
Attorney, Agent, or Firm—Henry T. Brendzel

[57] ABSTRACT

Disclosed is a network for steering signals on a plurality of input signal lines, some of which are signal carrying and the remaining are idle, so that the signal carrying lines are grouped at adjacent ones of the network's output. The steering of all input lines is done simultaneously by concurrently computing for all lines the required steering in an adder network and executing the steering of all lines simultaneously in a routing network responsive to the adder network.

18 Claims, 11 Drawing Figures

SELF-ROUTING STEERING NETWORK

TECHNICAL FIELD

This invention relates to steering networks for switching systems and, more particularly, to networks that steer incoming signals at input ports to adjacent ones of the networks's output ports.

BACKGROUND OF THE INVENTION

Steering networks are networks that accept signals from a large plurality of signal sources and steer, or switch, those signals in accordance with some aim, generally to desired destinations. The plurality of sources is generally one where not all of the sources are active at any one time, and the destinations are generally paths or service providing equipment. Steering is useful when the number of paths or the number of service providing equipment is smaller than the number of sources, and where it is not critical to which one of the paths or service providing equipment the connection is made. Because the sources dynamically share access to the destinations on a demand basis and because the number of destinations is smaller than the number of sources, steering is a form of concentration. Thus, many concentration functions are implemented with steering networks.

In many steering and concentration applications the required processing occurs mostly during the service request period, as contrasted with the information communication period. In such applications, time delay to achieve the steering and concentration is not critical because incoming requests generally require neither immediate nor simultaneous response to all incoming requests. In consequence of this insensitivity to delay, prior art steering networks characteristically employ sequential operation. The steering network's circuitry sequentially monitors all incoming lines and when a service request is detected, the line requesting service is connected to an available one of a plurality of paths or service providing equipments. This approach is too slow for high speed steering applications.

Recent advances in high speed switching can not fully realize their potential without new techniques and arrangements for steering information within switching systems so that the switching system processors can operate both quickly and efficiently. The steering circuits internal processing should therefore be arranged to optimize the efficiency of the overall processing of the switching system.

In a copending application, entitled "Self-Routing Switching Network" and filed on even date herewith, A. Huang and I have disclosed a wide band, full access, self routing switch that is adapted to a packet switching environment. In a packet switching environment, information is processed, moved, and otherwise handled in short bursts, or packets. Each packet contains an activity bit to indicate whether the packet contains information or is empty (a "0" or a "1", respectively, for example) followed by an address field which may comprise a number of subfields (most significant bits first). The address field is followed by an information field which carries the data. All packets are synchronized so that the processing equipment can operate on many packets simultaneously. The simultaneous and synchronous operations within the self routing switch makes speed and parallel operation necessary attributes of the components that make up the switching network. Other attributes which are desirable are modularity and distributed control.

For efficient utilization of the self routing switch in applications where there are many potential users of the switch but only a small number of active users at any one time, in my copending application we have concluded it to be advantageous to include a steering network to serve as a preprocessing concentrator. However, the requirement of simultaneous and synchronous operation could not be satisfied by prior art steering networks or concentrator networks because of their sequential operation characteristic.

Herein is disclosed a steering network architecture that possesses the desired attributes of speed and parallel operation, permitting the realization of a concentrator stage for a packet-switching, self routing, full access switching network.

SUMMARY OF THE INVENTION

The steering network of my invention routes all signals simultaneously, and does so with a minimum delay. It employs distributed control and is modular in nature.

In response to activity indications on incoming lines, the steering network of my invention simultaneously computes the steering necessary for its incoming lines and concurrently switches its internal signal paths so that all active lines are simultaneously steered to adjacent ones of the steering network's output ports. With my invention, if one considers all of the steering network's output ports to be numbered 1 to N, the active signals are steered to the adjacent output ports 1 through K, simultaneously; where K is the number of active lines and it is less than or equal to N.

In one specific illustrative embodiment of my invention, the steering network includes as functional elements a delay portion, an adder portion, a routing portion (which portions may comprise separate network elements or be combined), and a control. The adder portion comprises an array of flip-flops and successive arrays of adder circuits which simultaneously compute for each input line of the steering network the necessary steering of signals on active ones of the input ports. The computation for each line comprises the determination of the number of inactive lines to one side of the line (e.g., to the left in FIG. 1). The delay portion comprises a shift register for each input port to interpose a delay of the input signals which is equal to the delay incurred by the adder elements in computing the necessary steering. The routing portion comprises successive levels of routing elements, each element being connected both to the same column element in the next row and to a distant column element shifted to the left by an amount equal to $2^{i-1}$, where i is the level number. The routing achieved in the routing portion steers the signal of each line to the left by a number of lines equal to the number of inactive lines to the left of the steered signal. Each routing element comprises a control flip-flop to store a control bit from the adder network and a strobing clock signal. OR and AND gate logic circuits connect the input signals to the routing elements under direction of the control flip-flops to reclocking flip-flops. In this embodiment, active outputs appear simultaneously at adjacent leftmost output ports, thus minimizing subsequent processor hardware.

In another embodiment of my invention, the adder network is used to sum the active lines rather than the inactive lines, and the sum is used to route the active lines through a network comprised of $\log_2 n$ shuffled switching stages. This network is somewhat similar to a network described by D. H. Lawrie in "Access and Alignment of Data in an Array Processor", IEEE Transactions on Computers, Vol. C-24, No. 12, December 1975, pp. 1145–1155, which he referred to as the Omega network.

DETAILED DESCRIPTION

Figure 1:
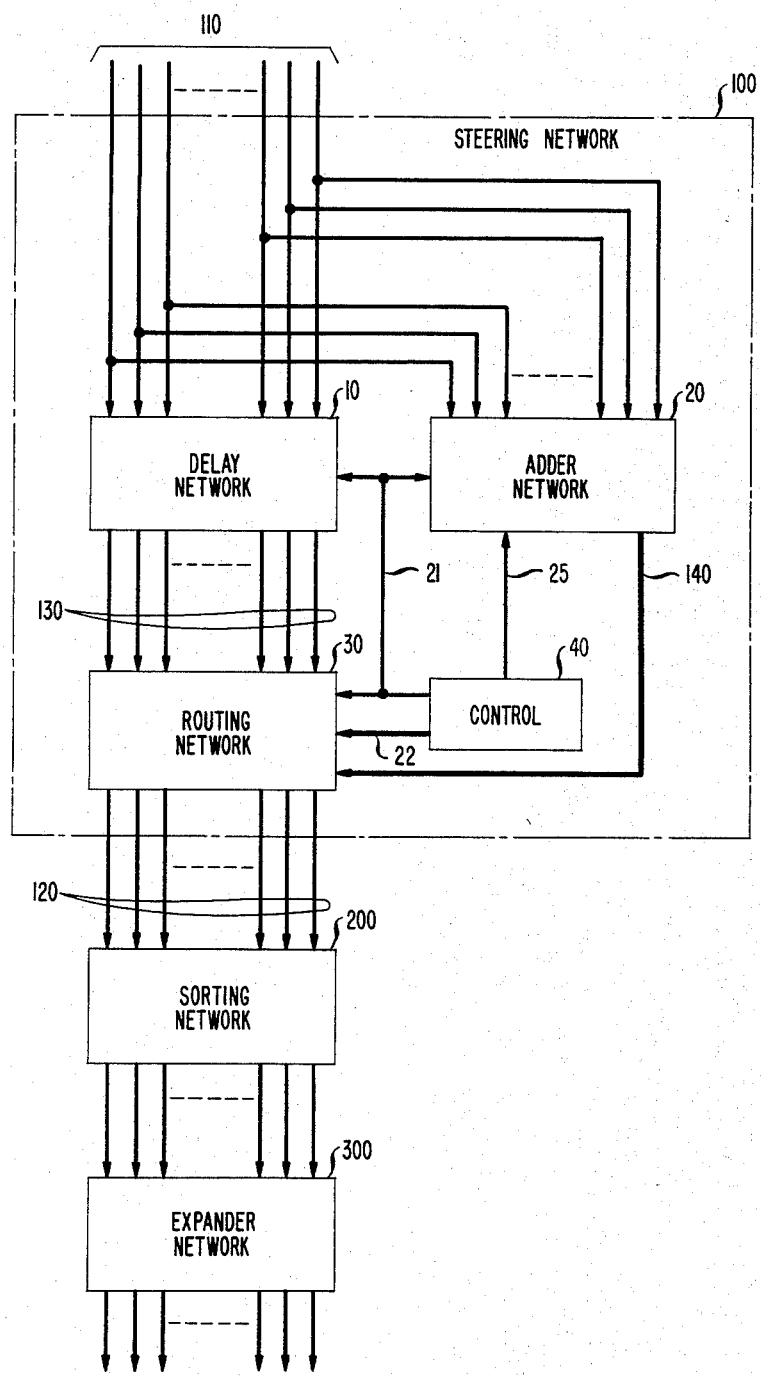
FIG. 1 depicts one illustrative embodiment of the steering network of my invention, in block diagram form, as utilized to implement a concentration function in a wide band switch.

FIG. 1 is a block diagram showing an illustrative embodiment of a steering network 100, in accordance with the principles of my invention, employed as a concentrator stage in a wide band communication switch which includes a sorting network 200 responsive to steering network 100 and an expander network 300 responsive to sorting network 200.

Steering network 100 comprises a delay network 10 and an adder network 20, both connected to input lines 110 of the steering network, and a routing network 30 responsive to networks 10 and 20. Network 10 supplies signals to network 30 via lines 130 and network 20 supplies signals to network 30 via lines 140. The output signals of routing network 30 are connected to output lines 120 of steering network 100. A control module 40 within steering network 100 provides clock signals to elements 10, 20 and 30, via lead 21, lead 25 and bus 22.

In operation, steering network 100 determines which input lines 110 contain active signals and routes those signals to output lines 120 of the steering network so that the active signals are all steered simultaneously to adjacent ones of the network's output lines. This routing is done by shifting all active signals (e.g., to the left in FIG. 1) and ignoring the inactive ones. In the first illustrative embodiment described below, the shifting, or steering, operation of the steering network is akin to the movie theater usher asking everyone in a partially filled row to move left until all patrons are seated adjacent to one another. Each patron counts the total number of empty seats to his or her left and moves that many positions to the left. In a second illustrative embodiment described below, the steering is akin to the movie theater usher counting the number of people in a row and specifying a seat number for each person.

Adder network 20 is used to count the number of inactive lines (or active lines) to the left of each active line. The number of inactive lines corresponds to the number of positions that each active line must shift left so that all active lines will be adjacent. Delay network 10 stores the data until adder network 20 develops the appropriate control signals and routing network 30 implements the necessary routing computed by adder network 20.

To determine the number of inactive lines to the left of each active line, adder network 20 must recognize the activity bit of each line and sum the number of "0" activity bits to the left of the line. The number of inactive lines to the left of each line is the left shift distance of each line. A matrix-like structure which performs this function is shown in FIG. 2.

Figure 2:
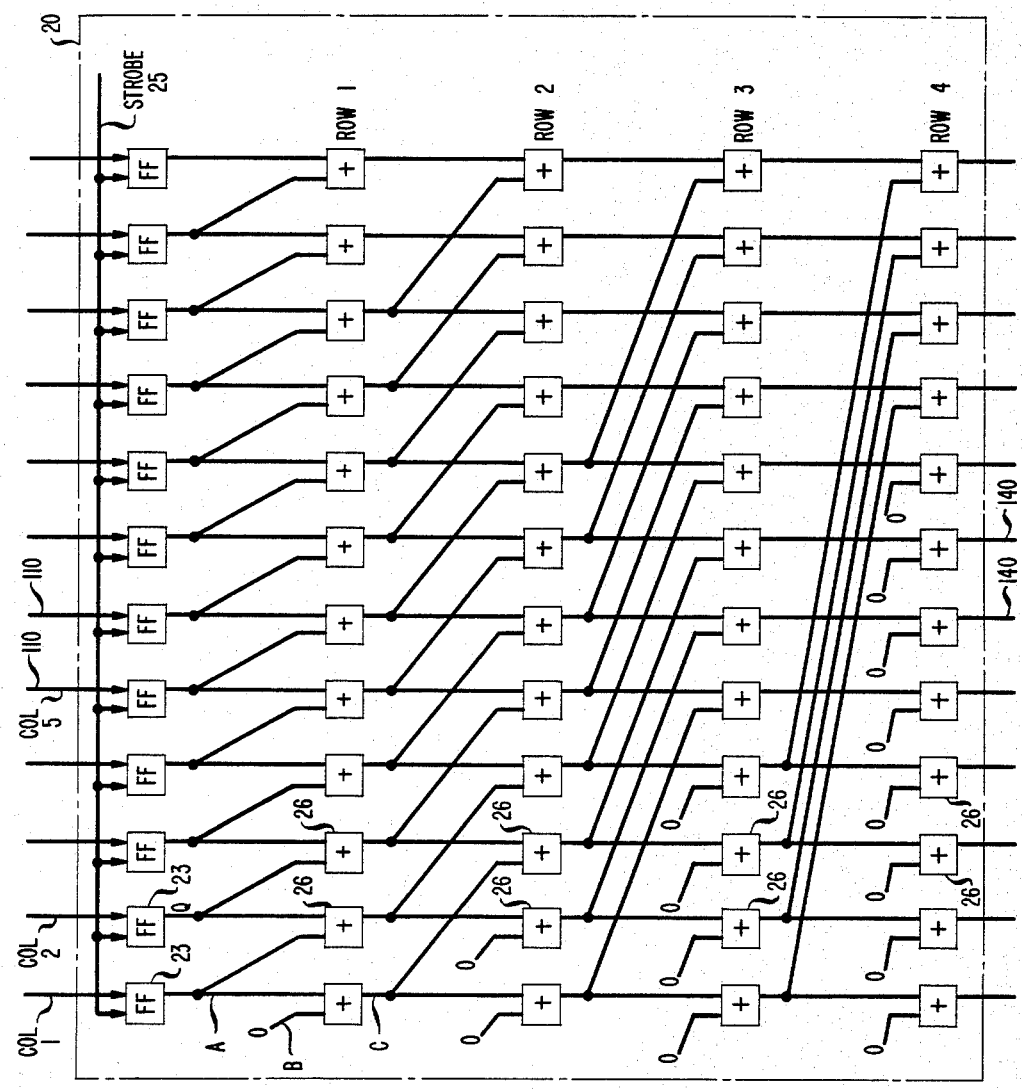
FIG. 2 presents the detailed structure of one illustrative embodiment of the adder network within the steering network of FIG. 1.

For the illustrative purposes of this disclosure, adder network 20 in FIG. 2 is shown to have only 12 input lines. More lines are, of course, permitted. The initial row in network 20 comprises flip-flops 23 which store the activity bits of the packets appearing on input lines 110. The flip flops are followed by four rows, or levels, of interconnected adder circuits 26. In general, the number of adder circuit levels, M, is equal to $\log_2$ of the number of the steering network's input ports, N, rounded up. In FIG. 2, $\log_2$ of 12 is 3.58, so M is rounded up to 4.

The adder circuits in FIG. 2 are interconnected to develop an output signal for each input line which represents the number of inactive lines to the left of the line. These signals are shift control signals which are applied to routing network 30 via lines 140.

Specifically, each activity bit-storing flip-flop 23 is connected to a line 110 and provides it's noninverting output signal to an adder circuit 26 in the first level of adder circuits. Each flip-flop 23 is clocked with strobe line 25, which derives its control signal from control module 40.

Each adder circuit 26, having signal inputs A and B and a signal output C, develops a binary sum of its inputs in serial arithmetic. Serial arithmetic means that the sum output of each adder circuit appears sequentially, with least significant bit first.

The interconnection of the adder circuits within network 20 is highly regular. It can most easily be described by identifying each adder circuit according to its position in adder network 20 through subscripts i and j, where i designates the level, or row, and j designates the column, or line. Thus, $A_{3,5}$ and $B_{3,5}$ identify the input ports, and $C_{3,5}$ identifies the output port, of the adder circuit in the third row and fifth column.

Employing the above designations, the interconnection of adder circuits 26 in adder network 20 is described by the following equations:

$$A_{i,j} = C_{i-1,j}$$

and $$B_{i,j} = C_{i-1,j-k}$$

where $k = 2^{i-1}$, $i = 1, 2, \ldots M$, and connections to undefined terminals (e.g. $B_{3,1} = C_{2,-3}$) are 0.

Figure 3:
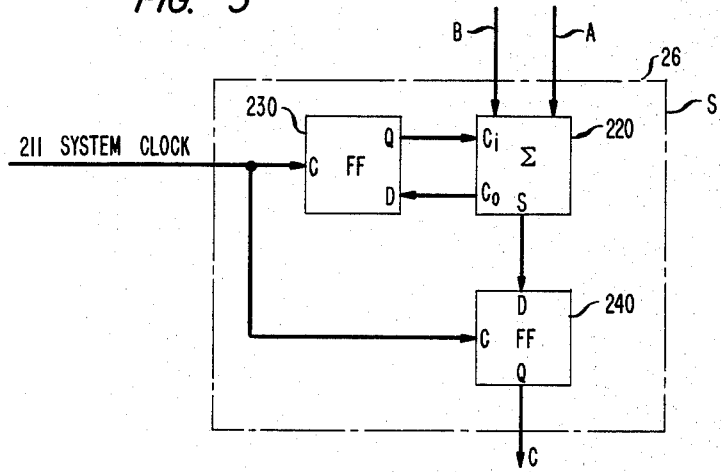
FIG. 3 shows one embodiment of the adder circuits within the adder network of FIG. 2.

FIG. 3 illustrates one embodiment of adder circuit 26. Therein, input ports A and B are connected to binary sum circuit 220 (e.g. integrated circuit SN74LS385, or equivalent). The carry output of circuit 220 is reclocked by flip flop 230 and fed back to sum circuit 220 as the carry input. The sum output is reclocked by flip flop 240 before exiting the adder circuit.

Figure 4:
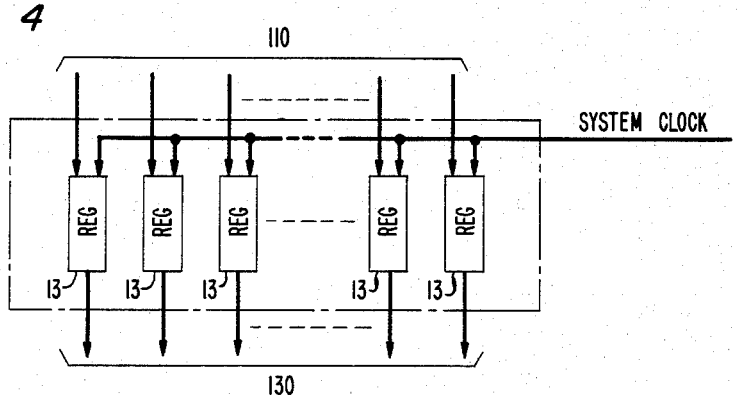
FIG. 4 provides an illustrative embodiment of the delay network within the steering network of FIG. 1.

Because of the reclocking provided by flip-flop 240 in each adder circuit 26, a delay of M clock periods is introduced by adder network 20. Correspondingly, delay network 10 is arranged to provide the same delay of M clock periods so that the activity bits of the packets entering routing network 30 coincide with the least significant bits of the shift control signals out of network 20. To provide for this delay, the illustrative embodiment of FIG. 4 shows delay network 10 to contain a plurality of shift registers 13, each dedicated to a different input line 110 of the steering network and providing an output signal on a different line 130.

Figure 5:
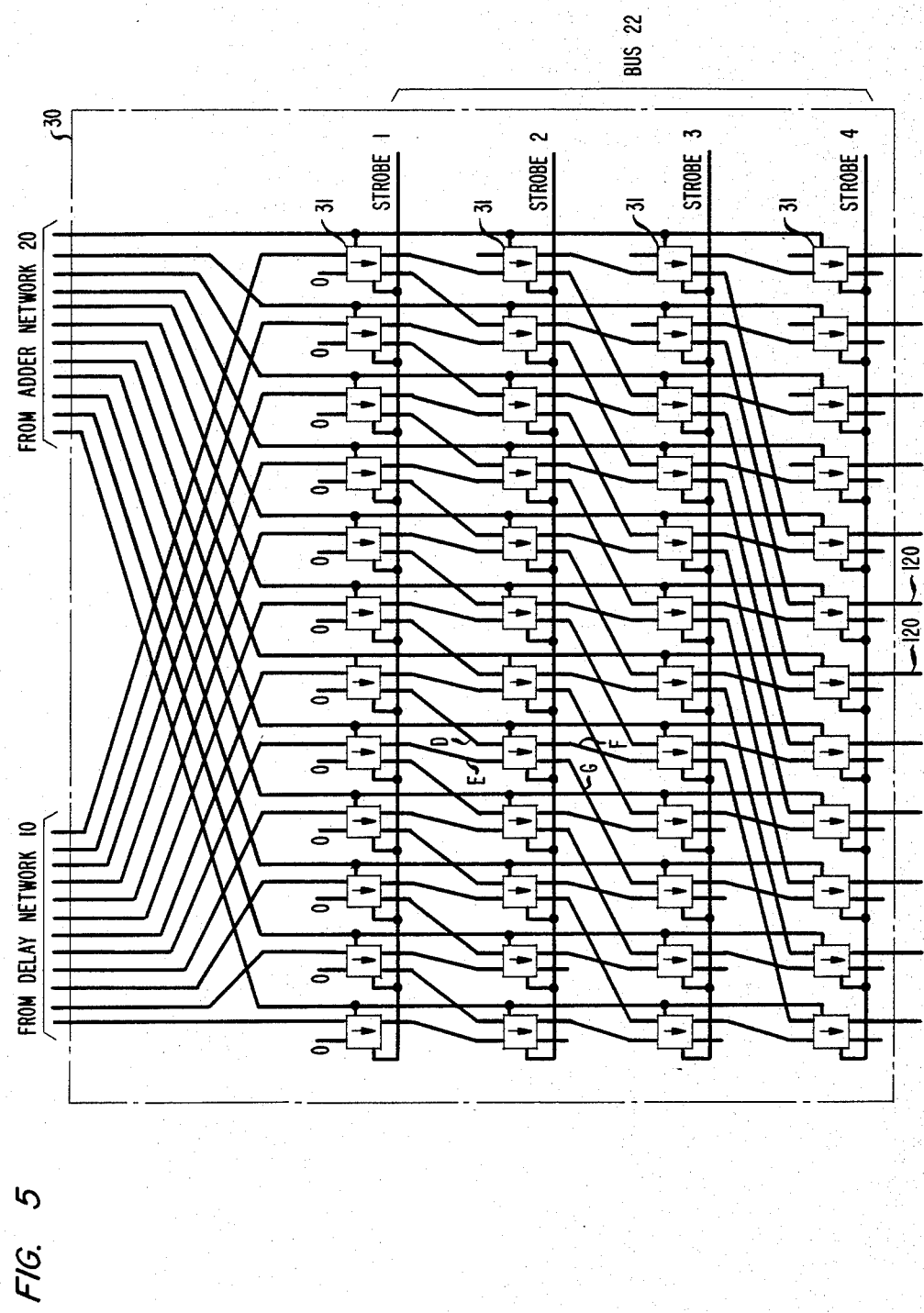
FIG. 5 presents the detailed structure of one illustrative embodiment of routing network 30 of FIG. 1.

FIG. 5 shows the details of routing network 30 for the embodiment that computes the number of idle lines and thereby determines the number of lines by which an active line is shifted to the left. The network of FIG. 5 is also matrix like, comprising a number of rows, or levels, of interconnected routing elements 31. Each routing element 31 is shown to have signal inputs E and D, a routing control input, a strobe clock input, and signal outputs F and G.

Each level in routing network 30 executes the switching mandated by a specific bit of the shift control signals from adder network 20. That switching is either a "pass-through" or a "shift" to the left and the shift is of a distance equal to the weight of the control bit (1,2,4,8, etc.). The least significant bit controls the first level in network 30 and succeeding bits control succeeding levels. Thus, the distance of the left shift in each level is equal to $2^{i-1}$, where i is the level number.

The routing elements' interconnections are defined by the following equations:

$$E_{i,j} = F_{i-1,j}$$

and $$D_{i,j} = G_{i-1,j+k}$$

where, as before, i and j represent the row and column, respectively, $k = 2^{i-1}$ with $i = 1, 2, \ldots M$, and connections to undefined terminals are 0.

It should be observed that the number of levels of adder circuits in network 20, M, is also the maximum number of bits per word expected out of network 20. Since each bit of network 20 controls one level in network 30, it follows that network 30 also has M levels. A row of OR gates following the last row of routing elements 31 completes the interconnection pattern of the above equations.

The control interconnections within network 30 are simpler than the signal interconnections. In principle, wherever a particular signal is found in any level, the control of that signal for the next level should be routed to where the signal is. However, the control signals need not be so routed because it suffices to transfer the control signals of network 20 along the columns of network 30. Accordingly, FIG. 5 shows the control lines connected along the columns of network 30 and appropriate strobe signals enter the control signal bits into the different levels of routing elements 31.

Figure 6:
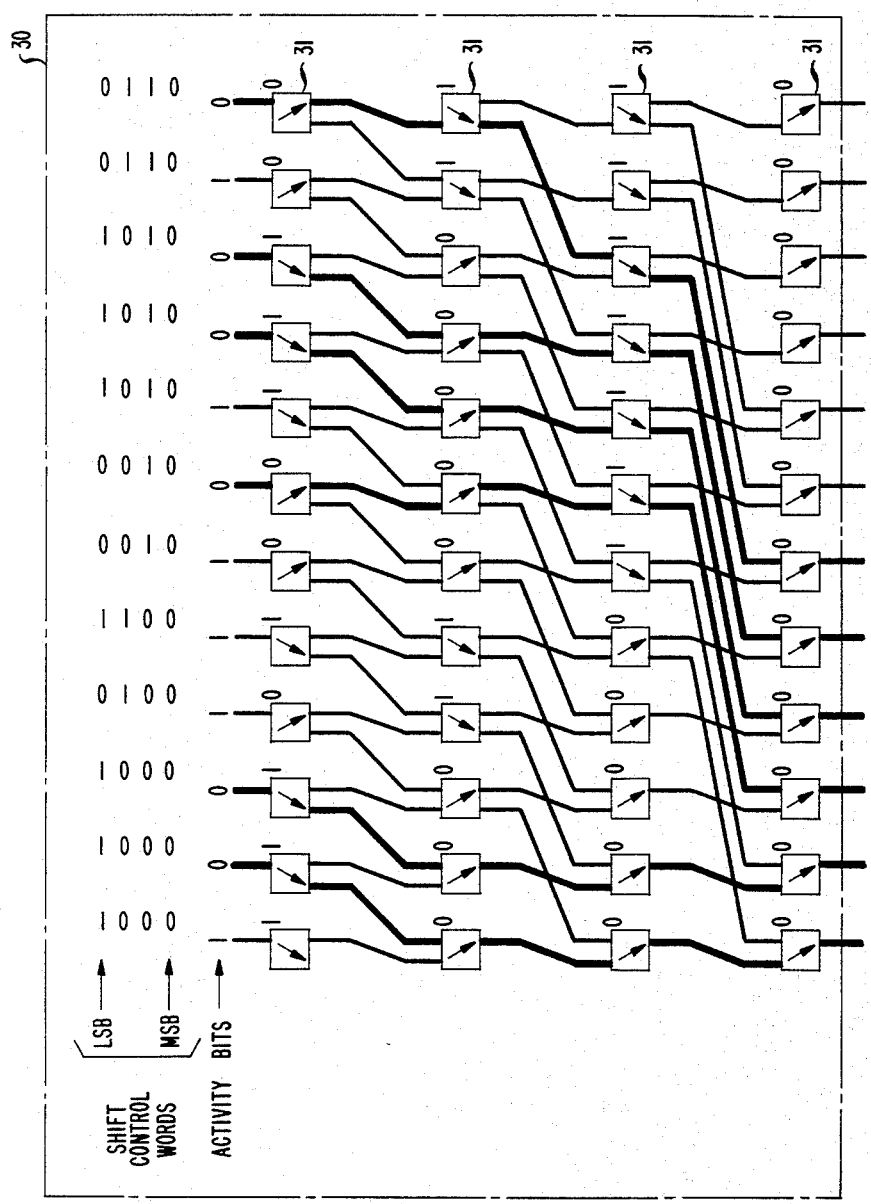
FIG. 6 provides an illustration of the steering accomplished within the routing network of FIG. 5.

A specific example is presented in FIG. 6, showing the signal paths for a specific pattern of input signals. Input lines 2, 3, 7, 9, 10, and 12 are active (identified with an "0") and the remaining lines are inactive (identified with a "1"). Next to each input line is a binary number, representing the shift control signal from adder network 20 which dictates the left shift. These shifts are 1, 1, 1, 2, 3, 4, 4, 5, 5, 5, 6, and 6, for input lines 1 through 12, respectively. The individual control bits of are also shown next to the routing elements which they control. The steered lines are depicted in FIG. 6 by the heavy lines terminating at output ports 1 through 6. As in FIG. 5, a row of OR gates following the last row of routing elements 31 completes the interconnection pattern.

Figure 7:
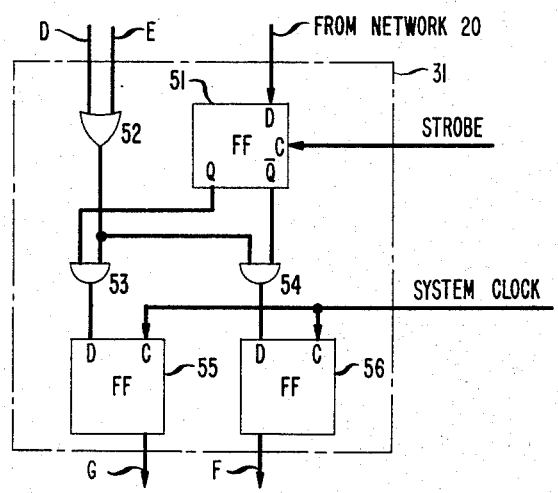
FIG. 7 shows one illustrative embodiment of the routine elements within the routing network of FIG. 5.

Routing elements 31 may be implemented as shown in FIG. 7. Flip-flop 51, responsive to shift control signals from network 20, stores the application shift control bit with the aid of a strobe signal provided by control module 40. Input signal ports D and E are combined in OR gate 52 and the output of gate 52 is connected to AND gates 53 and 54. Gate 53 is also connected to the true output of flip-flop 51 and gate 54 is also connected to the inverse output of flip-flop 51. The outputs of gates 53 and 54 are connected to output signal ports F and G through reclocking flip-flops 55 and 56, respectively.

From the above it can be seen that control module 40 has very light burdens. It must supply a system clock, a strobe clock to network 20 and M staggered (by one clock period) strobe clocks to elements 31 in network 30. The first of the network 30 M strobe clocks is delayed M clock periods from the strobe clock applied to network 20.

Figure 8:
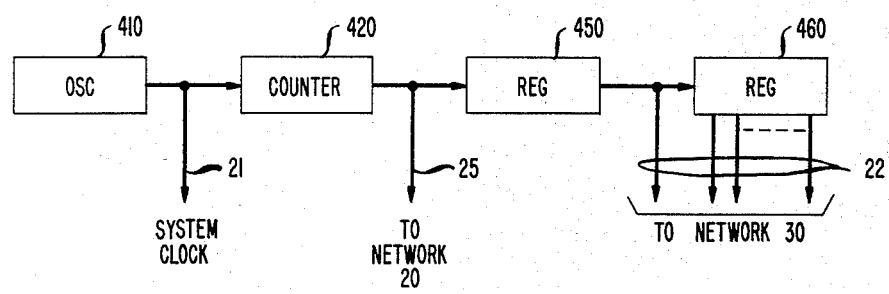
FIG. 8 illustrates one implementation for control module 40.

The strobe signal to network 20 must coincide with the activity bit of the incoming packets, and that implies one of two conditions. Either information comes to the steering network of this invention which includes the basic synchronization clock and an indication of when to expect the activity bit or, alternatively, control module 40 is the source of this information. FIG. 8 presents a realization of control module 40 which develops the basic system clock.

In FIG. 8, oscillator 410 provides the system clock to networks 10, 20 and 30 and to various components in control module 40, including counter 420 which divides the system clock by J and develops a "carry out" pulse which marks the appearance of the activity bit at the input to network 20. The output of counter 420 is applied to a shift register 450 which provides a delay of M clock periods and the output signal of shift register 450 is applied to tapped shift register 460 which develops the set of M control signals applied to network 30.

As indicated earlier, steering control may be achieved by counting the number of active lines rather than the number of inactive lines. Adder network 20 may easily be modified to do such counting by employing the $\overline{Q}$ rather than the Q outputs of flip-flops 23 and by setting all B inputs in the first column of adder circuits to "1" rather than "0". This initializes the sum to $-1$ so that the first active line increases the sum to 0 and is directed to the $0^{th}$ output line 120, i.e., is the left most output line of network 30.

With such a modification, the output signal of each line 140 of adder network 20 is a binary shift control word, least significant bit first, which identifies the specific output line 120 to which the associated input line 130 is to be connected. For example, for the FIG. 6 activity pattern 1, 0, 0, 1, 1, 1, 0, 1, 0, 0, 1, 0, the derived sum signals specify connection to lines 120 numbered

−1, 0, 1, 1, 1, 1, 2, 2, 3, 4, 4, 5.

It may be noticed that some destinations are repeated. The repeats are associated with idle lines which, as shown below, are disregarded.

Figure 9:
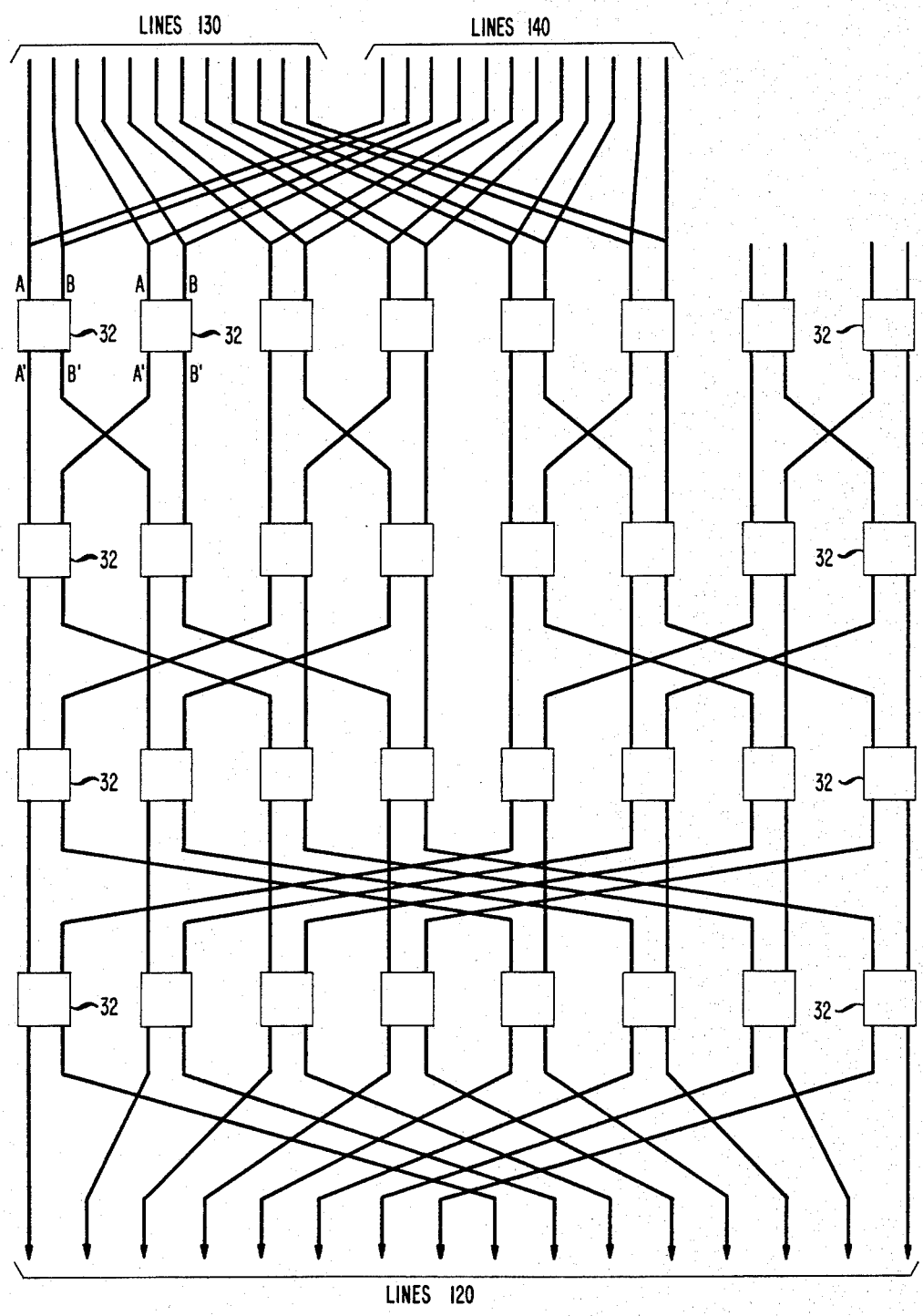
FIG. 9 illustrates an alternate embodiment of routing network 30.

The sum signals computed by the modified adder network 20 are applied to a routing network 30 that is necessarily of a different structure than the one depicted in FIG. 5. One structure that is suitable for this illustrative embodiment is shown in FIG. 9. It is similar to the structure of the Alignment Network described by D. H. Lawrie in "Access and Alignment of Data in an Array Processor", IEEE Transactions on Computers, Volume C-24, No. 12, December 1975 pages 1145 to 1155.

FIG. 9 shows network 30 to comprise four rows (capable of accepting $2^4$ or 16 input lines 120) of switch elements 32 that are interconnected in a modified shuffle pattern. For the sake of clarity, line 130 and 140 pairs are shown joined at the top of FIG. 9 and each element 32 is shown to have only two inputs and two outputs. Actually, following this "joining" each depicted path represents a pair of paths: data derived from a line 130, and control derived from a line 140.

The term "shuffle" derives from the familiar shuffling of a deck of cards, which follows the procedure of dividing the deck into halves and reassembling the deck by alternately taking one card from each of the halves. Such a shuffle is called a "perfect shuffle". The reverse of this may be called an inverse perfect shuffle. See H. Stone "Parallel Processing with the Perfect Shuffle", IEEE Transaction on Computers, Vol. C-20, pp. 153–161, Feb. 1971. The modified shuffle, sometimes called a Banyan network, shown between the stages of FIG. 9 is akin to dividing the deck into halves, dealing out one card each to two "hands" from each of the halves alternatively, repeating the process until all cards are dealt to the new "hands" and then reassembling the deck by placing one of the dealt "hands" on top of the other. It is a simple rearrangement of the inverse perfect shuffle. In FIG. 9, the "cards" to be shuffled are the shown sets of interconnection paths between rows. Each set of interconnection paths between rows contains a number of "decks", each having a particular number of "cards". Specifically, following the first row each "deck" contain 4 "cards", following the second row each "deck" contain 8 "cards", and so on; increasing with each row by a factor of two. Following the last row, an inverse perfect shuffle is executed.

Each element 32 has inputs A and B and outputs A' and B' and it is capable of assuming a "pass through" state or a "cross" state. Each input, as indicated earlier, represents a data input and a control input, and likewise with respect to each output. The state that each switch element 32 assumes is dependent on the activity bits and on specific shift control word bits of the signals entering switch element 32 via lines 130 and 140. More particularly, the first stage of switch elements 32 (top stage in FIG. 9) is controlled by the least significant bits of the shift control words and each successive stage is controlled by the next higher order bits of the shift control words. The Truth Table below specifies the state that a switch element 32 assumes in response to its input conditions, and a circuit design implementing this Truth Table is shown in FIG. 10.

| Truth Table | | | | | |
|---|---|---|---|---|---|
| A input activity bit | B input activity bit | A input control word bit | B input control word bit | routing | desired switch position |
| 0 | 0 | 0 | 0 | A→B',B→B' | pass |
| 0 | 0 | 0 | 1 | A→A',B→B' | pass |
| 0 | 0 | 1 | 0 | A→B',B→A' | cross |
| 0 | 0 | 1 | 1 | A→B',B→B' | cross |
| 0 | 1 | 0 | 0 | A→A',B→d* | pass |
| 0 | 1 | 0 | 1 | A→A',B→d | pass |
| 0 | 1 | 1 | 0 | A→B',B→d | cross |
| 0 | 1 | 1 | 1 | A→B',B→d | cross |
| 1 | 0 | 0 | 0 | A→d,B→A' | cross |
| 1 | 0 | 0 | 1 | A→d,B→B' | pass |
| 1 | 0 | 1 | 0 | A→d,B→A' | cross |
| 1 | 0 | 1 | 1 | A→d,B→B' | pass |
| 1 | 1 | 0 | 0 | A→d,B→d | d |
| 1 | 1 | 0 | 1 | A→d,B→d | d |
| 1 | 1 | 1 | 0 | A→d,B→d | d |
| 1 | 1 | 1 | 1 | A→d,B→d | d |

*d stands for "don't care".

Figure 10:
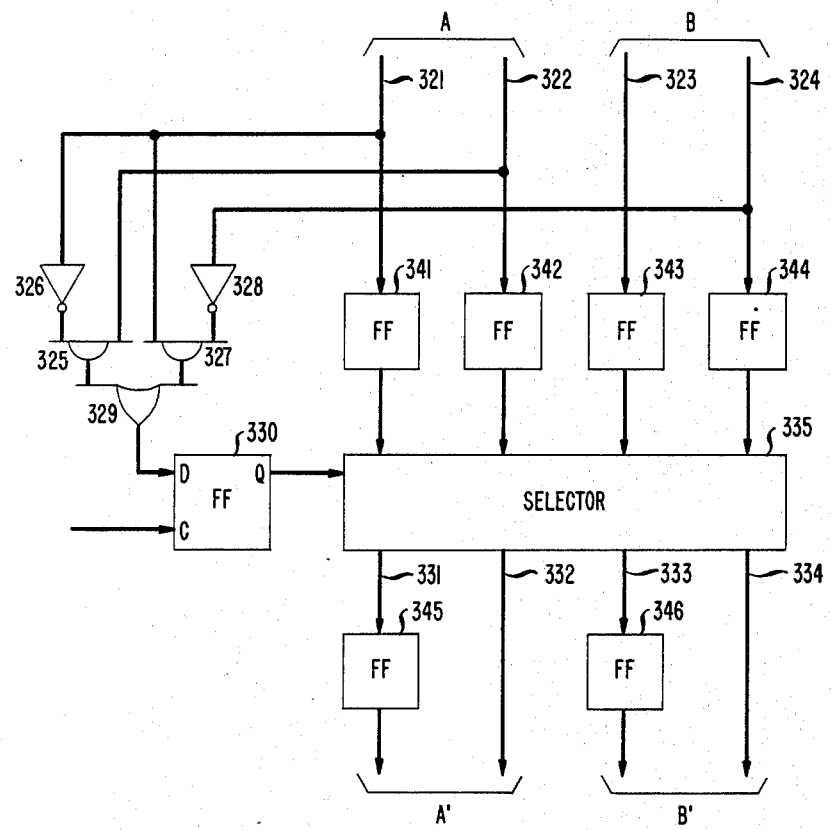
FIG. 10 depicts the structure of switching elements 32 within the routing network of FIG. 9.

Switch element 32, shown in FIG. 10, performs three functions: it detects the activity bits on each data input and the appropriate control bits on each control input, performs the "pass through" or "cross" switching, and advances the shift control word relative to the activity bit. Advancing of the shift control word causes the control bits needed at each row to always coincide with the activity bits as the signals propagate through the rows of network 30. This simplifies the switching and control burdens. The illustration in FIG. 10 explicitly shows the data and control paths. Lines 321 and 323 are the data lines of inputs A and B, respectively, and lines 322 and 324 are the control lines of inputs A and B, respectively. AND gate 325 is connected to line 322 directly and to line 321 through inverter 326. AND gate 327 is connected to line 321 directly and to line 324 through inverter 328. Gates 325 and 327 are connected OR gate 329 to which develops a signal for controlling the state of switch 32. This signal is captured in D flip-flop 330 (with the aid of a control signal from module 40) and applied to selector 335. Selector 335 is responsive to reclocked replicas of the signals on lines 321 through 324. The reclocking is done in flip-flops 341 through 344. Selector 335 is a conventional dual double-pole/double-throw switch (realized, for example, with AND and OR gates). It establishes either the "pass through" or the "cross" state for switch element 32 and applies its signals to lines 331 through 334. Lines 331 and 332 carry the data and control signals for the A' output of the switch and lines 333 and 334 carry the data and control signals for the B' output of the switch. Lines 331 and 333 are delayed through flip-flops 345 and 346, respectively, before exiting switch element 32. This advances the control in relation to the data to insure that the appropriate control bits coincide with the activity bits at the next row of switch elements 32.

Figure 11:
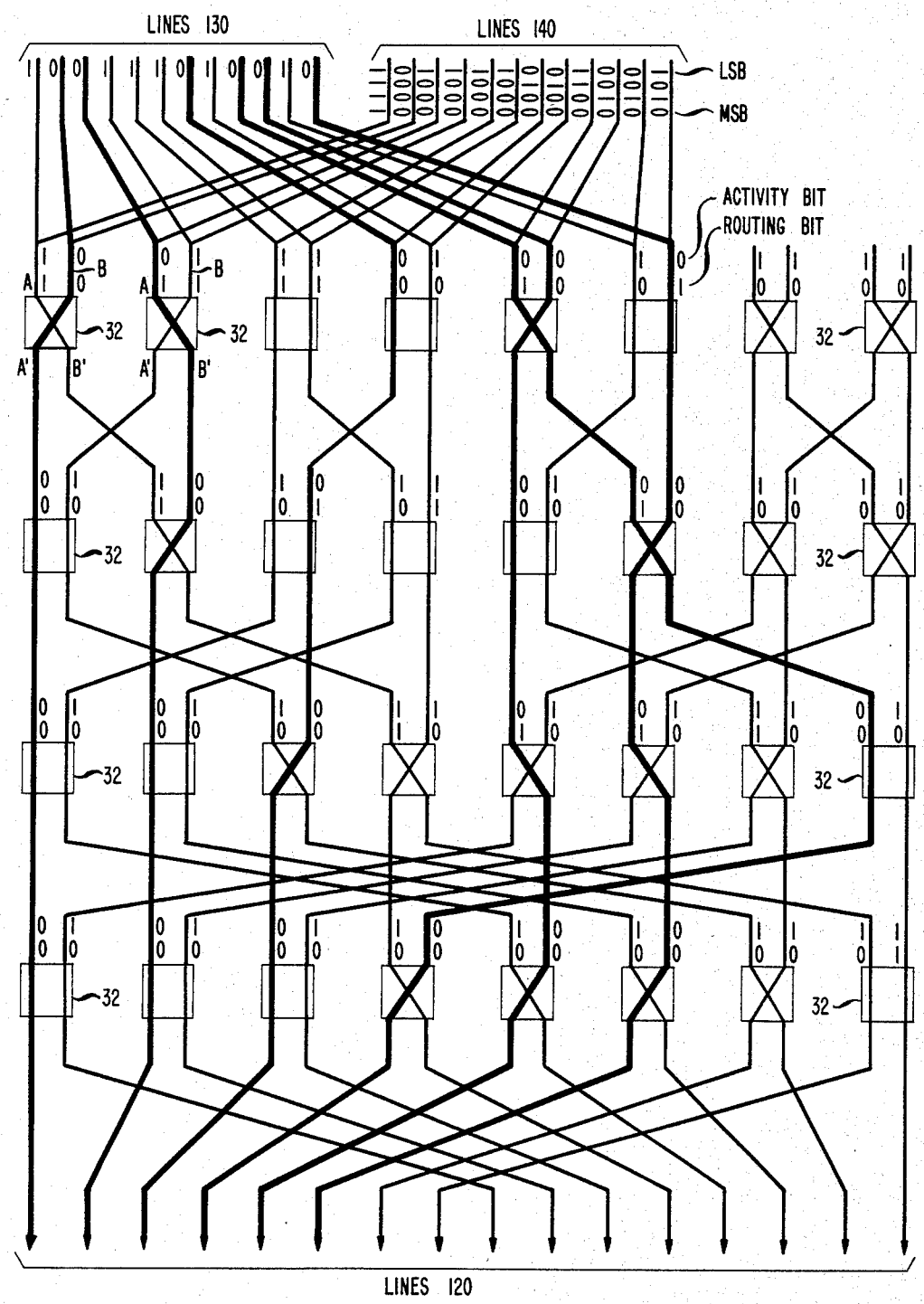
FIG. 11 provides an illustration of the signal steering accomplished within the routing network of FIG. 9.

FIG. 11 illustrates the operation of the above described routing network 30 in response to the activity bit pattern of FIG. 6. It clearly shows that the inactive lines, though each has an associated destination address, and not routed to that address but are segregated to the right of the active lines.

Although steering network 100 shown in FIG. 1 depicts three functional blocks, it does not mean that an embodiment of the steering network requires the blocks to be distinct. Indeed, since the steering network operates under the distributed control of adder network 20, often the embodiment of the steering network's functional blocks is merged to enhance modularity.

Also, although steering network 100 is disclosed in connection with a packet switching arrangement, it should be observed that the disclosed steering network is not dependent on the packet switching format and is, indeed, applicable to many different switching arrangements.

Further, VLSI embodiments of the above described circuits necessarily place a premium on low numbers of leads, and it is observed that embodiments that require fewer paths are possible and are considered within the scope of this invention. These embodiments generally require more complex circuitry. For example, the routing network 30 described in connection with the second illustrative embodiment may be designed with half as many leads (truly combining the control and data signals) if the signal packets are organized to allow an additional field to store the shift control words.

What is claimed is:

1. A steering network having a plurality of input ports and output ports, for routing the signals on active ones of said input ports comprising:
    first means responsive to signal activity on said input ports for simultaneously computing binary numbers indicative of the necessary steering of said signals on said active signal ports; and
    second means, connected to said input ports and responsive to said first means, for steering said signals on said active signal ports to adjacent ones of said output ports.

2. The steering network of claim 1 wherein said second means steers all of said active lines simultaneously.

3. The steering network of claim 1 wherein said second means includes delay means for interposing a delay of said input signals equal to the delay incurred in said first means in computing said necessary steering.

4. A steering network for simultaneously routing input signals from a plurality of input lines, where only some of said input lines carry said input signals at any one time, to a plurality of output lines so that said input signals are grouped at adjacent ones of said output lines comprising:
    an adder network, responsive to said plurality of input lines, for developing a plurality of control signals corresponding to and equal in number to said plurality of input lines, each of said control signals indicating the number of said input lines away from the corresponding input line which do not carry one of said input signals; and
    a routing network, responsive to said plurality of control signals from said adder network and to said plurality of input lines, for routing said input signals to said output lines under direction of said plurality of control signals.

5. The steering network of claim 4 wherein said adder network develops said plurality of control signals simultaneously.

6. The steering network of claim 4 wherein said routing network routes all of said input signals simultaneously.

7. The steering network of claim 4 wherein a delay network is interposed between said input lines and said routing network, said delay network delaying said input signals on said input lines by a delay equal to the delay incurred in said adder network in developing said control signals.

8. The steering network of claim 7 wherein said delay is M, where M is equal to $\log_2$ of said plurality of input lines, rounded up.

9. The steering network of claim 4 wherein said adder network comprises:
    storage means for indicating which of said input lines carry said input signals, responsive to said plurality of input lines and to a strobe signal; and
    a plurality of adder circuits connected to said storage means and interconnected to form a matrix having a number of columns equal in number to the number of said input lines and a number of rows equal in number to $\log_2$ of said number of said input lines, rounded up.

10. The steering network of claim 9 wherein said storage means comprises a plurality of flip-flops, each of which is connected to a different one of said input lines and to said strobe signal.

11. The steering network of claim 9, wherein said adder circuits comprise inputs A and B and output C and the interconnections among said adder circuits are defined by the equations $$A_{i,j} = C_{i-1,j}$$

and $$B_{i,j} = C_{i-1,j-k}$$

where i is the row, j is the column, $k = 2^{i-1}$, and connections to undefined terminals are zero.

12. The steering network of claim 4, wherein said routing network comprises a plurality of routing elements, responsive to control signals emanating from said adder network, said routing elements interconnected in successive rows and columns, with the input signals of each of said rows of routing elements being derived from output signals of the immediately preceding one of said rows of routing elements and the input signals of the first one of said rows of routing elements being derived from said delay network.

13. The steering network of claim 4, wherein said routing elements have input terminals D and E and output terminals F and G, and the interconnections among said routing elements are defined by the equations $$E_{i,j} = F_{i-1,j}$$

and $$D_{i,j} = G_{i-1,j+k}$$

where i is the row, j is the column, $k = 2^{i-1}$, and connections to undefined terminals are zero.

14. A steering network for simultaneously routing input signals from a plurality of input lines, where only some of said input lines carry said input signals at any one time, to a plurality of output lines so that said input signals are grouped at adjacent ones of said output lines comprising:
    an adder network, responsive to said plurality of input lines, for developing a plurality of control signals corresponding to and equal in number to said plurality of input lines, each of said control signals indicating the number of said input lines away from the corresponding input line which carry one of said input signals; and a routing network, responsive to said plurality of control signals from said adder network and to said plurality of input lines, for routing said input signals to said output lines under direction of said plurality of control signals.

15. The steering network of claim 14, wherein said adder circuits comprises inputs A and B and output C and the interconnections among said adder circuits are defined by the equations $$A_{i,j} = C_{i-1,j}$$

and $$B_{i,j} = C_{i-1,j-k}$$

where i is the row, j is the column, $k = 2^{i-1}$, and connections to undefined terminals are zero.

16. The steering network of claim 15 wherein said routing network is an inverse perfect shuffle network, executing shuffles of said input signals under control of said plurality of control signals.

17. A steering network having N input ports and a plurality of output ports, for routing the signals on active ones of said input ports comprising:
first means responsive to signal activity on said input ports for simultaneously computing binary numbers indicative of the necessary steering of said signals on said active signal ports with a processing delay of said computing being proportional to $\log_2$ of N; and
second means, connected to said input ports and responsive to said first means, for steering said signals on said active signal ports to adjacent ones of said output ports.

18. The steering network of claim 1 wherein said binary numbers are computed in accordance with the number of said active ones of said input ports.

* * * * *